Sept. 11, 1956 F. F. FINE 2,762,506
NUT SEPARATOR
Filed March 11, 1954 3 Sheets-Sheet 1
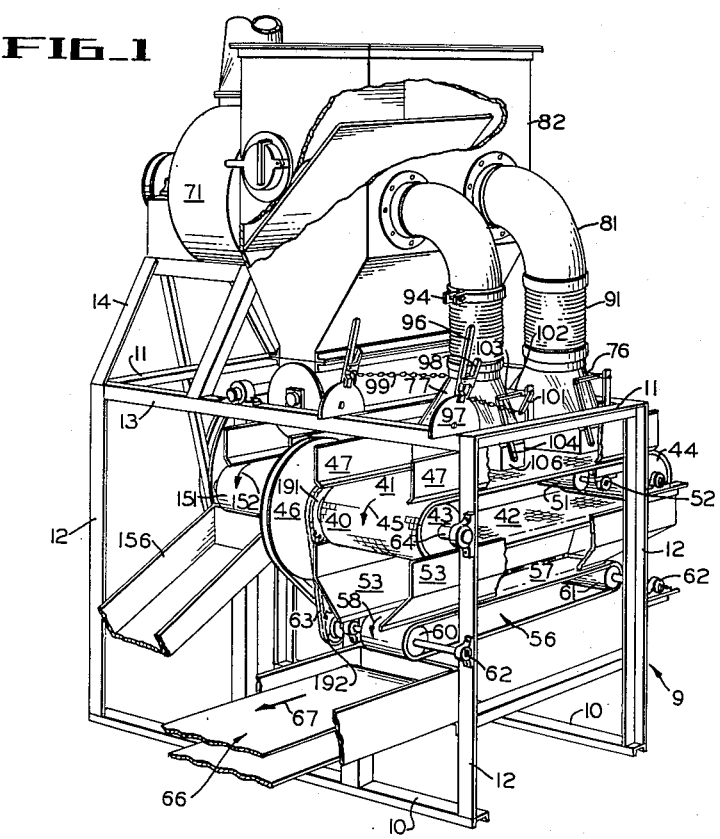
FIG_1
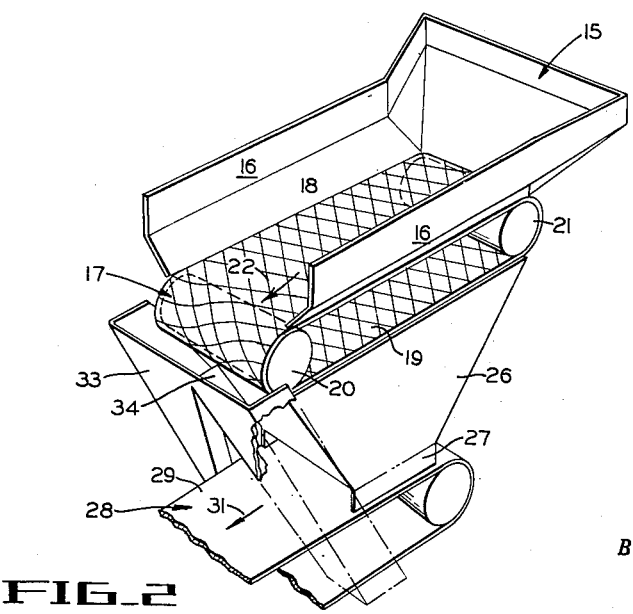
FIG_2
INVENTOR.
FRED F. FINE
BY
ATTORNEY Sept. 11, 1956     F. F. FINE     2,762,506
NUT SEPARATOR
Filed March 11, 1954     3 Sheets-Sheet 2
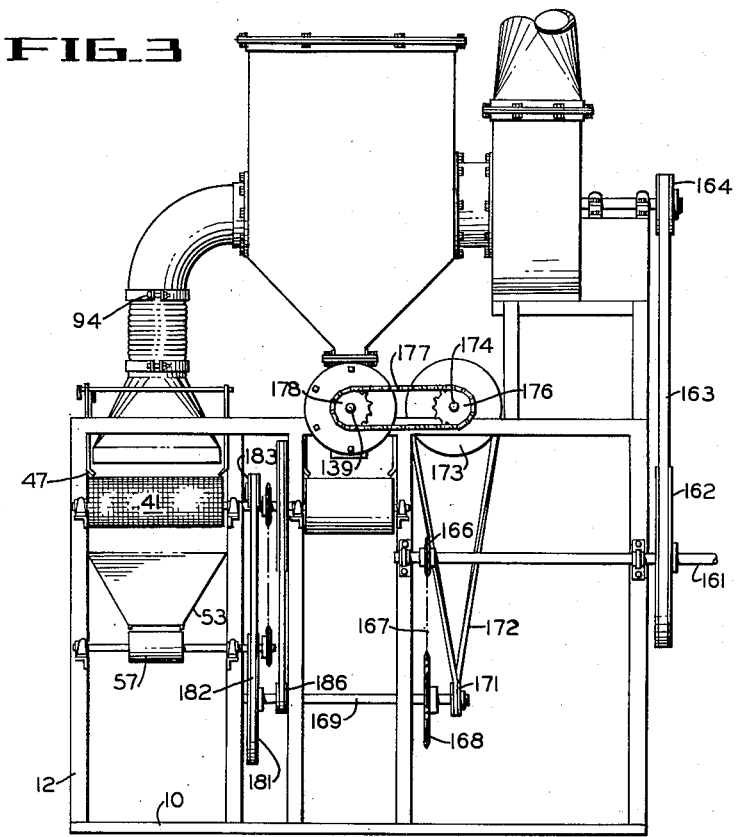
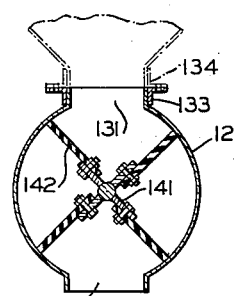
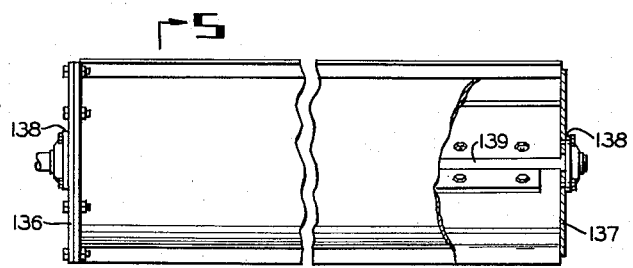
INVENTOR.
FRED F. FINE
BY
ATTORNEY Sept. 11, 1956  F. F. FINE  2,762,506
NUT SEPARATOR
Filed March 11, 1954  3 Sheets-Sheet 3
FIG_6
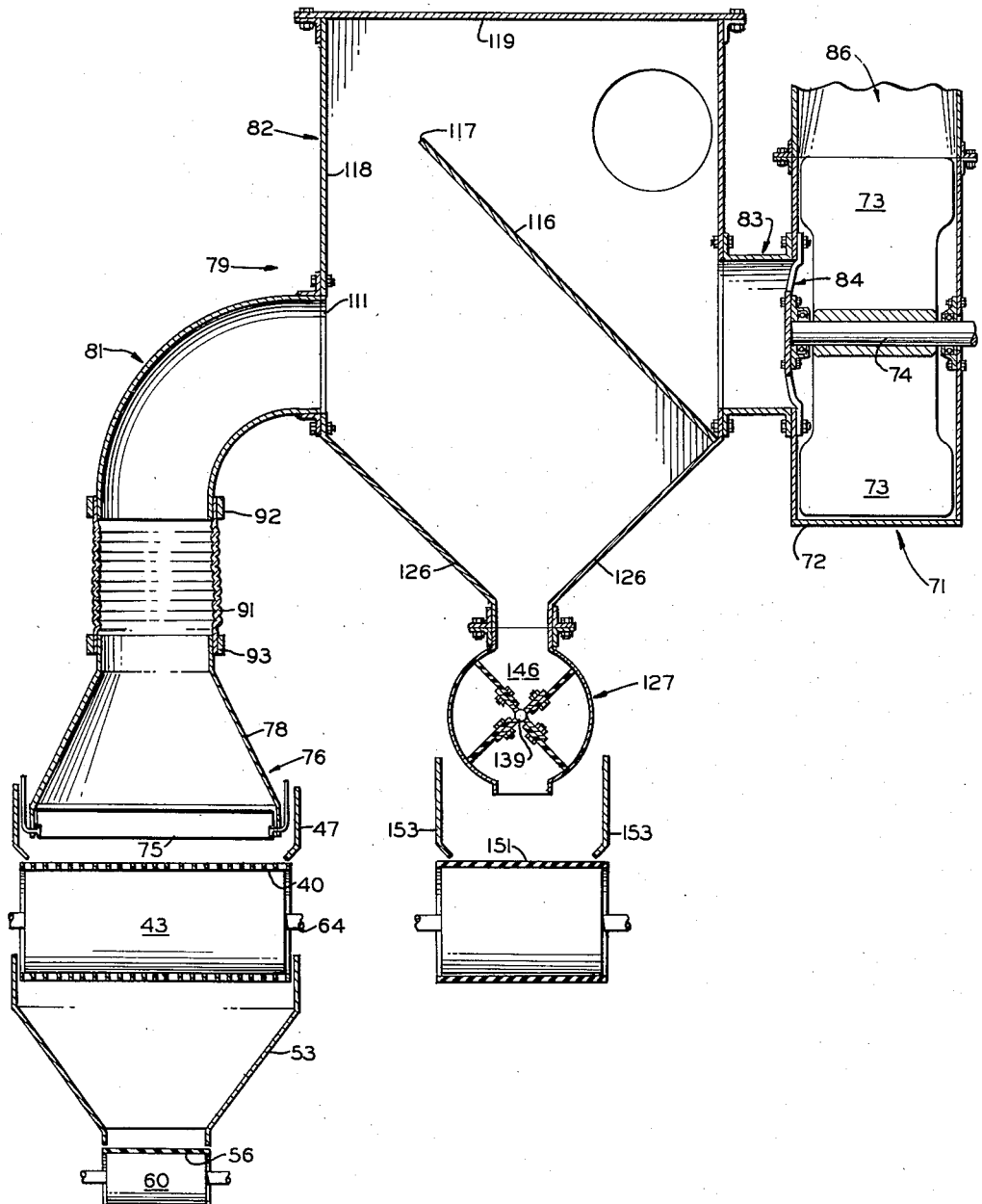
INVENTOR.
FRED F. FINE
BY
ATTORNEY

United States Patent Office 2,762,506
Patented Sept. 11, 1956

2,762,506

NUT SEPARATOR

Fred F. Fine, Durham, Calif.

Application March 11, 1954, Serial No. 415,636

3 Claims. (Cl. 209—27)

My invention relates to agricultural machinery and especially to machinery for separating harvested orchard crops, such as almonds, walnuts, and prunes, from foreign material, such as tree leaves, twigs, rocks and dirt, picked up with the crop at the time of harvesting.

Owing to the increasing shortage of farm labor, the latter years have witnessed a considerable increase in the use of agricultural machinery to perform labor heretofore accomplished by hand. One of the types of equipment which has come into widespread use is a crop harvester, for example, a nut harvester, which sweeps over the ground under the nut trees and picks up the nuts which have become dislodged from the trees, either by their becoming ripe and falling off the trees, or by shaking or in other ways agitating the trees to cause the nuts to fall to the ground below. Nut harvesters of this kind ordinarily employ rotating fingers to sweep the nuts from the ground into a conveyor wherein rough separation of the nuts from dust, clods, rocks, leaves and twigs is accomplished by a blower, the nuts and accompanying unseparated foreign matter then being fed into bins or sacks for further cleaning and separating as, for example, in a nut separator.

Nut separators of the kind previously used have been deficient in numerous respects, particularly in their inability to discriminate between different weights of nuts and between nuts and foreign particles having a nut-like size and shape, and their inability to provide a continuous rather than a batch type of operation. Furthermore, most of the nut separators heretofore utilized have made no provision for carrying away in any suitable manner the products of separation. Additionally, the rate of separation has been slow and the quality of separation unsatisfactory.

It is therefore an object of my invention to provide a nut separator which is portable and which occupies a small amount of floor space, yet which is capable of handling a high volume of product.

It is another object of my invention to provide a nut separator which is relatively clean in operation and does not cause the surrounding area to become indiscriminately cluttered with separation products.

It is still another object of my invention to provide a nut cleaner which efficiently separates nuts from the attendant unwanted foreign material and carries the foreign material to locations as desired.

It is yet another object of my invention to provide a nut separator having vacuum means which is adjustable to permit selection between both nuts of low specific gravity and high specific gravity and between nuts and unwanted foreign matter.

It is still another object of my invention to provide a generally improved nut separator.

Other objects, together with the foregoing, are obtained in the embodiment illustrated in the accompanying drawings and described in the accompanying description.

Figure 1 is a perspective of the nut separator of my invention.

Figure 2 is a perspective of my pre-separator mechanism.

Figure 3 is a side elevation of the nut separator.

Figure 4 is a front elevation of the air lock to an enlarged scale.

Figure 5 is a section of the air lock taken along the plane indicated by the line 5—5 of Figure 4.

Figure 6 is a section in semi-diagrammatic form taken along a generally median longitudinal plane of the separator.

Supporting the several components of my nut separator is a frame, generally designated 9, comprising a pair of lower longitudinal channel members 10 supported on the ground, transverse channel members 11, vertical members 12, upper longitudinal members 13, and blower supporting members 14.

As the nuts are brought in from the field, ordinarily in sacks, they are intermingled not only with rocks, clods of dirt and other relatively small and compact pieces of material, but also with elongated particles such as twigs and sticks of various sizes and shapes. In order first to remove the twigs and sticks, I provide a pre-separator, as appears most clearly in Figure 2. At the top of the pre-separator is a feed or intake hopper 15 and side-boards 16 between which runs an endless belt 17 having an upper run 18 and a lower run 19 reaved over a pair of belt pulleys 20 and 21, shown diagrammatically, the belt being driven by suitable pulley driving mechanism in a direction indicated by the arrow 22. The belt 17 is formed from a corrugated metal material, or wire mesh, and has a large mesh size, of approximately 2 inches, for example. This relatively large size permits all of the smaller items, such as nuts, rocks, clods and dirt, which are poured downwardly onto the top run of the belt, to fall downwardly through the meshes of the belt into a hopper 26 having an opening at the bottom and guides 27 for conducting the descending nuts, rocks, dirt, and similar material, onto a second belt 28 having a top run 29 traveling, for example, toward the left, as shown in Figure 2, in the direction indicated by the arrow 31. Since, however, most of the twigs, sticks, and larger leaves span one or more of the openings in the perforated belt 17, those larger or elongated particles are supported by the mesh and are carried on top of the belt 17 toward the left, in the direction of the arrow 22, and are allowed to fall downwardly at the end of the belt run into a pair of downfall chutes 33, for example, conveniently having a centrally divided portion 34. The downfall chutes conduct the twigs and sticks and other elongated material carried over by the belt 17 either to a basket, or onto a conveyor belt, permitting the twigs and sticks and miscellaneous elongated material to be transported away to some other location as desired. Such material will ordinarily be organic in nature and can appropriately be disposed of as, for example, by burning or by scattering on the land. It is to be understood that the hopper and belt 17 can be faced in any convenient direction with respect to the nut separator as, for example, in a direction 90 degrees from that shown in Figure 2.

As a result of the operation of the pre-separating mechanism, the belt 28 carries along on its upper run 29 only materials, such as nuts, rocks, clods, short twigs, leaves and dirt having a size comparable to the nuts or smaller, all material larger or longer than the mesh size of the large mesh perforated belt 17 having been separated in the pre-separator. The pre-separator is preferably mounted adjacent one end of the nut separator itself although it can also conveniently be installed at a location a few feet away from the separator in the event that the twigs, leaves and sticks separated out by the pre-separator can be more easily disposed of in such more distant location.

Where the pre-separator is installed as an integral part of the nut separator itself, the pre-separator belt 28 can be the same perforated belt as the belt indicated by the number 40 appearing on the nut separator shown in Figure 1 in which case the pre-separator hopper guides 27 are located directly over the input or right-hand end of the top run of the belt 40. On the other hand, if the pre-separator is to be located at a position some distance away from the separator itself, then the nuts, rocks, clods, small leaves, dirt, etc., being carried on the top run 29 of the belt 28 can fall by gravity onto the perforated belt 40 shown in Figure 1 by overlapping the downfall end of the belt 28 over the input end of the top run of the belt 40. In either event, the belt 40, having an upper run 41 and a lower run 42, is a flexible metallic belt having perforations therein, the perforations being smaller than the size of the smallest nuts which are to be separated. I have found that a mesh belt having, for example, a thickness of the order of one-half inch or so, so that each perforation provides a separate channel, gives a very satisfactory result. The belt 40 is reeved over a pair of pulleys 43 and 44, respectively, the pulleys rotating in a direction such as to drive the upper run 41 of the belt in a direction shown by the arrow 45, the driving pulley 43 itself being rotated by a suitable power pulley 46. The material being carried along by the belt 40 is confined to the belt by a pair of side boards 47 running transversely of the framework and along each side of the upper run of the belt.

One of the major purposes of the perforated belt 41, in addition to carrying the nuts and other material from the pre-separator to the nut separator, is to separate quickly from the nuts the unwanted foreign particles of smaller size, such as dirt, sand, and small rocks and pieces of clod. I therefore provide a transverse belt agitator 51 or vibrator eccentrically mounted between the upper and lower runs of the belt in bearings 52, the agitator being in contact with the upper belt run 41 and rotated at a high speed, for example, 1000 revolutions per minute. The eccentricity of the agitator shaft is about one-quarter inch, with a corresponding throw of approximately one-half inch. The rapid eccentric rotation of the vibrator causes violent agitation of the upper run 41 of the flexible perforated belt. This violent agitation not only shakes loose dirt and sand which enter with the nuts or which cling to the nuts and rocks but also acts effectively to break up clods of dirt into smaller particles. All agitated particles smaller than the nuts themselves and smaller than the mesh size of the perforated belt 40 thence fall by gravity down through both runs of the perforated belt and are conducted by a pair of inclined side panels 53 onto a belt 56 having an upper run 57 driven in a direction shown by the arrow 58. The belt 56 is preferably unperforated and is reeved about a pair of rotatable pulleys 60 and 61 mounted in bearings 62, the driving pulley 60 being rotated by a chain belt 63 or other convenient drive, which is actuated by a drive shaft 64 rotated by the power pulley 46. The downfall from the belt run 57, including dust, dirt, sand, small pebbles, and clods, and other foreign material, is permitted to drop by gravity over the discharge end of the belt onto a conveyor belt 66 which transports the foregoing material to another location for handy disposal.

The material separated by the agitation of the perforated belt 40 and conducted away by the successive conveyors 56 and 66 largely comprises small inorganic and non-combustible particles of soil and soil constituents. While this material can not be disposed of by burning, the conveyor belt 66 by suitable constructional additions (not shown) can be adapted to carry the material to a location on adjacent land, or to a bin or cartage vehicle for other appropriate disposition.

Agitation of the perforated belt 40 is extremely effective in dividing out the smaller particles, and is able to perform this separation very quickly. Nevertheless, the nuts on top of the belt 40 are often still accompanied by and intermingled with foreign, unwanted matter such as larger sized rocks and unbroken dirt clods and by such particles of leaves, twigs and branches as were not divided out by the pre-separator.

In order to separate the nuts and other lower specific gravity material, such as leaves and small twigs, from the higher specific gravity material, such as the rocks and clods, I provide a vacuum separating system, comprising a vacuum inducing mechanism such as a blower 71 having the customary scroll-shaped casing 72 and blading 73 mounted on a shaft 74 rotatable by any suitable power supply device, such as an electric motor (not shown). Rotation of the blades 73 induces the flow of air from the atmosphere adjacent the mouths 75 of a pair of nozzles differing in size, the larger nozzle preferably being the one closer to the intake or upstream end of the belt 40 and designated by the numeral 76, while the downstream and smaller nozzle is designated 77, the nozzles being located above the belt 40, and producing in the area adjacent the nozzle mouths an uprushing current of air or "vacuum." One portion of the entering air enters the nozzles by flowing inwardly and thence around the nozzle mouth peripheries while another portion flows upwardly through the channel-like perforations of the belt before entering the nozzle. The latter air flow pattern is especially effective to force upwardly the nuts, leaves and small twigs into the nozzle since the channel-like perforations of the mesh belt are in a vertical attitude while below the nozzles and the air flow is consequently in a vertically upward direction, the air impinging on the underneath sides of the nuts and leaves and blowing them directly upwardly into the nozzles. The blower-induced current of air passes upwardly through a nozzle hood 78 and a vacuum duct, generally designated 79, comprising an elbow-shaped intake pipe 81, a hopper 82 and a hopper outlet pipe 83 or blower inlet pipe. The air then enters the eye 84 of the blower 71, is compressed by the blower and is discharged via a blower outlet pipe 86 either into the atmosphere, into a loosely woven collecting bag (not shown) for collection and periodic disposal, or other suitable location.

The ascending currents of air existing in the neighborhood of the nozzle mouth 76, and particularly the air streams passing upwardly through the channelized perforations of the belt 40 are effective to lift the lighter objects such as the nuts, broken nut shells, leaves and twigs but are ineffective to force upwardly into the vacuum separating system the heavier objects on the belt, such as rocks and clods of dirt. These latter heavier particles thus continue to move along on and with the top run of the belt 40 in the direction of the arrow 45 and upon reaching the discharge end of the belt are allowed to fall downwardly onto the belt 66 where they join with the smaller previously-separated rocks, clods and dirt and are carried by the belt 66 in the direction of the arrow 67 to a convenient disposal point in the same fashion as their similar but smaller counterparts.

Walnuts, almonds, pecans, prunes and substantially all the other types of similar crops vary in specific gravity, and the same situation obtains as between crops of the same kind. A crop of walnuts, for example, harvested from the same field at the same time will vary substantially in specific gravity from one specimen to another. The moisture content of one nut may considerably exceed the moisture content of another nut and will, accordingly, be heavier.

In order to effect the separation of several kinds of field crops, that is, to effect separation of crops of almonds, pecans, prunes, etc., as well as walnuts, I provide mechanism for adjusting the strength of the "vacuum" to suit the particular crop to be taken care of. My vacuum adjusting mechanism is also effective to handle all specimens of the particular crop being processed at the time. For example, if walnuts were being processed, the vacuum strength can be easily and nicely regulated to pick up all of the walnuts up to and including the heaviest specimens of walnuts which will be encountered.

While the blower speed can, by suitable controls, be changed to produce a greater or weaker vacuum, I have found that a nicer control is obtained by vertical positioning of the larger nozzle 76 and the smaller nozzle 77 with respect to the top run 41 of the perforated belt 40. Preferably the upstream or larger nozzle 76 is located at a position somewhat downstream from the area of the belt 40 wherein separation of sand, dirt, etc. is effected by agitation of the belt and by gravity. By first dividing out these smaller particles of dirt, etc., those undesirable particles are prevented from entering the vacuum separation system. Vertical movement of the nozzles is permitted by the interposition of a flexible hose 91 or bellows fastened at its upper end to the elbow 81 by an upper strap clamp 92 and at its lower end to the nozzle hood by a lower strap clamp 93, tightening of the straps being effected by suitable fasteners 94. In order vertically to adjust the nozzles, I provide for each nozzle a hand lever 96 pivotally mounted to rotate concentrically with respect to the margin of an arcuate plate 97, the lever having pivotally mounted thereon a hand grip 98 normally in engagement with the outer margin of the plate and while thus in engagement holding the lever in fixed position. Hand pressure on the upper portion of the hand grip disengages the grip from the plate and permits rotation of the lever to the desired position whereupon release of the hand grip is again effective to engage the plate and hold the lever in position. Movement of the lever effects vertical translation of the nozzle. Fastened to the lever and extending therefrom toward the nozzle is a chain 99 or other linkage connected to a first crank arm 101 secured to a shaft 102 from which projects in a direction toward the lever a second crank arm 103 having pivotally mounted at its end a depending link 104 rockably mounted at its lower end to a nozzle hood cheek 106. Preferably, the shaft 102 extends to the other end of the nozzle hood where a similar and symmetrically disposed crank arm and depending link is likewise connected to the nozzle hood on the other cheek thereof. In order to raise the nozzle hood, the hand grip is released and the lever swung in a direction away from the nozzle hood; to lower the hood, the hand grip is released and the weight of the nozzle, acting through the linkage members, moves downwardly under the force of gravity until stopped at the desired position by release of the hand grip.

Both nozzles are provided, as shown, with similar nozzle positioning mechanisms and both nozzles are adjusted by the operator to obtain the most efficient separation. Ordinarily, the larger upstream nozzle will be adjusted first, the nozzle being lowered to a position a short distance above the nuts and other material on the belt, the blower speed having been set to its customary operating value. The nozzle can then be lowered until the "vacuum" exerts on the materials a lift sufficient to draw into the vacuum system substantially all of the lighter materials such as leaves, broken nut shells and small twigs as well as a majority of the lighter nuts. Then the second, smaller downstream nozzle 77 is lowered to a position close enough to the material on the belt to lift the leaves, twigs, etc., not picked up by the first nozzle 76 and to lift the heavier nuts not raised by the first nozzle. Ordinarily, after a suitable adjustment of both nozzles is made, minor regulation of the height of the second nozzle is quite adequate to take care of normal fluctuations of the particular harvested materials to be separated.

If, at the end of a run of walnuts, it is desired, next, for example, to separate a crop of almonds, the two nozzles can again be adjusted vertically, the differing size, shape and specific gravity of the almonds usually requiring a nozzle adjustment varying somewhat from the adjustment giving most efficient separation for walnuts.

With particular reference to Figure 6, it will be visualized that the vacuum adjacent the mouth 75 of the nozzle 76 will lift the nuts, broken nut shells, small leaves and twigs, upwardly from their position on the belt 40. These materials are sucked upwardly through the nozzle hood, bellows, and elbow 81 and thence through a hopper intake opening 111 into the hopper itself. The nuts and the foreign particles, such as leaves, broken nut shells and small twigs, are intermingled as they pass through the hopper opening and are moving in a generally horizontal direction and toward the right in the view of Figure 6. At this location, however, the air blast is forced to undergo a sudden change in direction and is deflected from a generally horizontal flow to a vertical flow. A deflecting plate 116 or baffle mounted transversely in the hopper and extending from a position adjacent the bottom of the blower intake 83 upwardly and toward the front of the hopper causes the entering air stream to turn sharply upwardly and then to curve around the lip 117 of the plate before proceeding downwardly and into the blower. The lip 117 is located approximately at a position equidistant from the front wall 118 of the hopper and from the hopper cover plate 119, it having been found that a throat or constriction having these dimensions is very effective to accomplish good separation.

The tendency of the air current, as it suddenly is deflected upwardly, is to carry with it all of the particles entrained in the flow. But not all of the particles are subjected equally to the forces acting on them. Particles having a relatively small mass, such as the leaves, broken shells and twigs, do not possess the inertia of a relatively large mass such as a nut. Consequently, lighter particles are more responsive to lateral forces tending to deflect them from their line of travel than are heavier particles; as a result, the nuts tend to continue their generally horizontal motion while the leaves, etc. are quickly deflected upwardly toward the baffle throat and thence downwardly and into the blower.

The inertial separation is assisted by another factor which is also based on the physical characteristics of the various particles. Walnuts, almonds, pecans, etc., are substantially compact, whereas the leaves, broken shells, twigs, etc. to be divided out are not compact, but instead present a relatively large surface area with respect to their volume. As a result, these latter particles are far more responsive, aerodynamically, to the forces exerted by an airstream, and thus are deflected upwardly by the airstream while the nuts tend to continue in their original direction of travel.

As a consequence, the unwanted particles are borne upwardly, thence downwardly into the blower while the nuts either fall directly into the hopper inclined collecting walls 126 or continue along their generally horizontal flight path until they strike the baffle plate and are deflected downwardly.

The foreign unwanted particles having been divided out, clean nuts are collected at the bottom of the hopper, ready for withdrawal and further handling. In order to maintain the "vacuum" in the vacuum system during withdrawal of the nuts I provide at the bottom of the hopper, and mounted on and below the lowest portion of the collecting walls 126, an air-lock 127. The air-lock comprises a horizontally disposed right circular cylinder wall 128 having adjacent its upper side an inlet opening 131 and at its lower side an outlet opening 132. A pair of mounting brackets 133 on opposite sides of the inlet opening 131 are in registry with corresponding brackets 134 on the bottom of the hopper collecting walls, appropriate fastenings being used to clamp the brackets together. The ends of the cylinder are closed by end plates 136 and 137, appropriate gaskets being provided to maintain air-tightness, the end plates having thereon central apertures and appropriate bearings 138 to receive and support for rotation an air-lock shaft 139 having an axis of rotation substantially coaxial with the axis of the air-lock cylinder. Mounted on the shaft for rotation therewith is a plurality of vane supports 141; mounted, in turn, on the vane supports are vanes 142, projecting radially outwardly to contact the cylinder wall, the vanes being preferably of flexible material to bear tightly against the wall and thus increase their ability to resist the infiltration of atmospheric air into the hopper. The number of vanes should be such that at any and all positions of rotation of the vanes, no direct passageway exists for the flow of air from the nut outlet 132 to the nut inlet 131; it has been found that four vanes serve well not only to accomplish this purpose, but also to seal especially tightly the hopper from the atmosphere for during most of the rotational cycle two vanes are in contact with the wall on each side of the shaft, as appears most clearly in Figures 5 and 6. Rotation of the vanes simultaneously effects withdrawal of nuts from the hopper and a discharge of nuts into the atmosphere. By gravity, a lowermost portion of the nuts in the hopper fall into a compartment 146 defined by the adjacent vanes. As the vanes rotate, the nut-carrying compartment rotates correspondingly, the nuts entrapped therein also being carried around until the compartment faces the outlet opening 132. The nuts are then permitted to fall by gravity onto a nut conveyor belt 151 suitably reeved over a pair of pulleys and having its top run moving in a direction indicated by the arrow 152 in response to appropriate rotation of the pulleys. A pair of sideboards 153 on each side of the belt keeps the nuts from falling off the sides of the belt. Below the discharge end of the belt a chute 156 is conveniently provided to receive the nuts and conduct them into sacks or bins or other appropriate facilities.

No minutely detailed showing of the power transmission mechanisms has been made since any suitable arrangement of power transmitting belts or chains is satisfactory. As most clearly appears in Figures 1 and 3, a primary shaft 161 is connected to a power source (not shown) such as an electric motor. From a pulley 162 on one end of the primary shaft 161 a V-belt 163 leads upwardly to a corresponding pulley 164 on the shaft 74 of the blower. Adjacent the other end of the shaft 161 a sprocket gear 166 and chain 167 transmit power to a corresponding gear 168 on a secondary shaft 169.

On one end of the shaft 169 is a pulley 171 having a V-belt 172 leading upwardly and reeved about a pulley 173 on a shaft 174 having a sprocket gear 176 mounted thereon and connected by a chain 177 leading to a corresponding sprocket 178 for rotating the shaft 139 of the air-lock. On the other end of the shaft 169 is a pulley 181 having a V-belt 182 reeved thereon and leading upwardly and around a pulley 183 mounted on the shaft 52 of the vibrator. Spaced from the pulley 181 and rotating with the shaft 169 is a pulley 186 having reeved thereon a V-belt leading upwardly and around the pulley 46 mounted on the shaft 64. With particular reference to Figure 1, it will be seen that the shaft 64 not only rotates the pulley 43 driving the perforated belt 40 but also the pulley about which is reeved the belt 151. Additionally, the shaft 64 has mounted thereon a sprocket gear 191 driving the chain 63 reeved about a sprocket gear 192 mounted on the shaft 62 and rotating the pulley 60 driving the belt 56. The mechanism and power transmitting arrangements utilized for driving the dirt carry-off belt 66 and the pre-separator mesh belt 17 are not shown, although any appropriate devices similar to those described above will be found to be satisfactory.

I have therefore provided a nut separator eminently capable of accomplishing the objects of my invention and have constructed and operated a number of actual physical embodiments thereof, all of which have performed in a very satisfactory manner.

What is claimed is:

1. A nut separator comprising a longitudinal frame, a perforated endless belt mounted transversely on said frame, the upper run of said belt being movable from one side to the other side of said frame, means for agitating said upper run of said belt whereby particles smaller than the size of said belt perforations are gravitationally separated from said belt, a first conveyor disposed below said perforated belt for transporting said gravitationally separated particles to a location adjacent said other side of said frame, a vacuum hood spaced above said perforated belt, means for adjusting the vertical spacing between said belt and said hood, a nut separating hopper mounted on said frame including an inlet conduit connecting with said vacuum hood, an outlet conduit connecting with a vacuum inducing means, a separating baffle disposed within said hopper having one side inclined toward said inlet conduit and the other side slantingly faced toward said outlet conduit, and an air-lock connecting on one side with the bottom of said hopper and on the other side with the atmosphere, said air-lock including means for carrying nuts into the atmosphere and substantially effective to prevent entry of air at atmospheric pressure.

2. A nut separator comprising a first perforated belt effective to support nut tree leaves and twigs and ineffective to support nuts, nut-sized and smaller particles, a second perforated belt below said first belt effective to support nuts and nut-sized and larger particles and ineffective to support particles smaller than the size of a nut, a nut separating hopper including a separating baffle mounted therein, a vacuum inducing blower mounted on one side of said hopper and connecting therewith to produce a vacuum within said hopper, a hood spaced above said second perforated belt and connecting with said hopper to receive nuts induced by said vacuum to move upwardly into said hood and into said hopper to strike said separating baffle at an acute angle for downward nut deflection, said vacuum being ineffective to lift nut-sized particles having a specific gravity substantially in excess of the nut, an outlet pipe on the discharge side of said blower for conducting separation products into the atmosphere, and an air-lock mounted beneath said hopper for conducting nuts from said hopper into the atmosphere and substantially barring the entry into said hopper of air at atmospheric pressure.

3. A nut separator comprising a frame, a perforated belt movable across said frame capable only of supporting objects of nut size and larger, a nozzle above said belt, a blower on said frame, a chamber interposed between said nozzle and the inlet side of said blower whereby the air pressure adjacent said nozzle is reduced to a predetermined amount less than atmospheric and whereby objects on said belt having a specific gravity equal to and less than that of a nut are urged into said nozzle and into said chamber, said chamber having a baffle plate disposed therein to define a nut receiving portion and a duct portion capable of passing objects having a specific gravity less than the specific gravity of a nut, and substantially air tight means for conducting the nuts collected in said nut receiving portion into the atmosphere.

References Cited in the file of this patent

UNITED STATES PATENTS

| | | |
|---|---|---|
| 602,250 | Ancel | Apr. 12, 1898 |
| 840,724 | Sweet | Jan. 8, 1907 |
| 1,233,965 | Bishop et al. | July 17, 1917 |
| 1,597,261 | Bishop | Aug. 24, 1926 |
| 1,706,800 | McWilliams et al. | Mar. 26, 1929 |
| 2,294,086 | Hinds et al. | Aug. 25, 1942 |
| 2,446,646 | Forrest | Aug. 10, 1948 |
| 2,634,858 | Vahey et al. | Apr. 14, 1953 |
| 2,643,768 | Eissmann | June 30, 1953 |
| 2,653,712 | Leighton et al. | Sept. 29, 1953 |

FOREIGN PATENTS

| | | |
|---|---|---|
| 788,232 | France | Oct. 7, 1935 |